United States Patent [19]

Russ

[11] Patent Number: 5,509,443

[45] Date of Patent: Apr. 23, 1996

[54] PRESSURE REGULATOR FOR INDUSTRIAL PROCESS EXHAUST SYSTEM

[75] Inventor: Stephen J. Russ, Farmington Hills, Mich.

[73] Assignee: Salem Engelhard, South Lyon, Mich.

[21] Appl. No.: 272,789

[22] Filed: Jul. 8, 1994

[51] Int. Cl.[6] ........................................... G05D 7/01
[52] U.S. Cl. ............................. 137/499; 137/503
[58] Field of Search ................................. 137/499, 503

[56] References Cited

U.S. PATENT DOCUMENTS 4,289,161  9/1981  Siegwart ............................. 137/499
4,986,321  1/1991  Nitzberg ........................... 137/503 X Primary Examiner—Robert G. Nilson
Attorney, Agent, or Firm—Lyman R. Lyon

[57] ABSTRACT

A pressure regulator for an industrial process system is connected between the industrial process equipment and pollution control equipment and exhibits a pressure inversely related to pressure changes in the pollution control equipment so as to maintain the exit pressure at the process equipment constant.

3 Claims, 1 Drawing Sheet

PRESSURE REGULATOR FOR INDUSTRIAL PROCESS EXHAUST SYSTEM

BACKGROUND OF THE INVENTION

Emissions from industrial processes often require treatment by pollution control systems. Generally, the industrial process emissions are drawn from the process equipment by a low pressure fan, ducted to the pollution control equipment and, after treatment, drawn from the pollution control equipment by a high pressure fan. The nature of most pollution control equipment requires that a plurality of valves be employed which are constantly cycling between the open and closed condition. Such cycling induces pressure and flow variations in the industrial process exhaust system.

The problem to which the present invention presents a solution is that certain industrial processes are sensitive to pressure fluctuations in the exhaust system therefrom. When the exhaust is connected to a pollution control system the problem is exacerbated. For example, in a conventional pollution control system, a high pressure exhaust fan exerts a suction of, for example, 20 to 40 inches water column on the discharge end of, for example, a thermal oxidizer. As many as 24 valve changes from open to close or close to open may occur in a 90 second period. Pressure fluctuations across the pollution control equipment are transmitted back through the industrial process exhaust ductwork thereby causing a similar fluctuation at the outlet of the process equipment which may seriously compromise industrial process efficiency.

Accordingly, there is a need for a pressure regulator that senses fluctuations in pollution control equipment and offsets the fluctuations by a compensating change in upstream duct pressure. The regulator preferably minimizes pressure fluctuations in the industrial process exhaust ductwork without requiring the introduction of additional air which compromises pollution control efficiency. Mathematically, the sum of pollution control equipment pressure and regulator pressure should be a constant at a given flow rate whereby pressure fluctuations in the pollution control system are not transmitted back to the industrial process equipment.

SUMMARY OF THE INVENTION

The aforesaid problem is solved, in accordance with the present invention by a pressure regulator that is interposed between the industrial process equipment and the pollution control equipment.

Specifically, the regulator comprises a sensor blade that is housed in a sensor duct that parallels a main industrial process exhaust duct. The sensor blade is mechanically linked to a regulator blade disposed in the main exhaust duct. A small amount of process emission flow is directed to the sensor blade at all times. The approach velocity of fluid flow to the sensor blade is, by design, relatively small so that there is virtually no velocity pressure immediately upstream or downstream of the sensor blade. Hence, the pressure drop across the sensor blade is due to the static pressure differential thereacross and is independent of blade angle.

The pressure differential across the sensor blade produces a force which, through an appropriate mechanical linkage, controls the angular position of a regulator blade. The regulator blade is positioned in the industrial process exhaust duct upstream of the sensor blade. The industrial process airflow is accelerated or decelerated within the process emission ductwork at the location of the regulator blade, causing a change in the pressure differential thereacross. The arrangement of components is such that rotation of the regulator blade angle relative to a plane extending transversely of the regulator flow path causes a change in the pressure differential across the regulator inversely to pressure variations in the pollution control equipment. Thus, pressure at the exit of the industrial process emission duct remains constant.

BRIEF DESCRIPTION OF THE DRAWINGS

FIG. 3 is a diagrammatic view taken generally along the line 3—3 of FIG. 2; and.

DETAILED DESCRIPTION OF THE PREFERRED EMBODIMENT(S)

Figure 1:
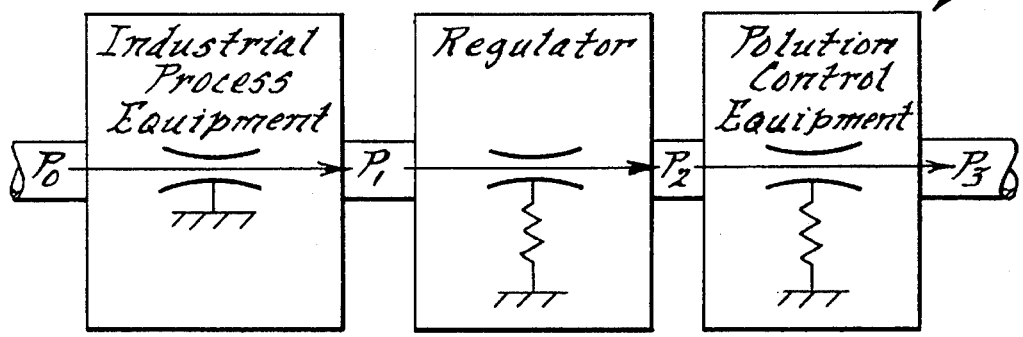
FIG. 1 is a diagrammatic flow chart showing the location of the pressure regulator relative to industrial process equipment and pollution control equipment.
Figure 3:
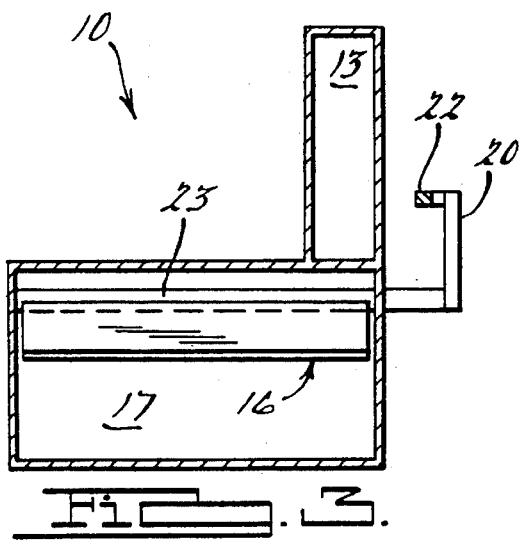
Figure 4:
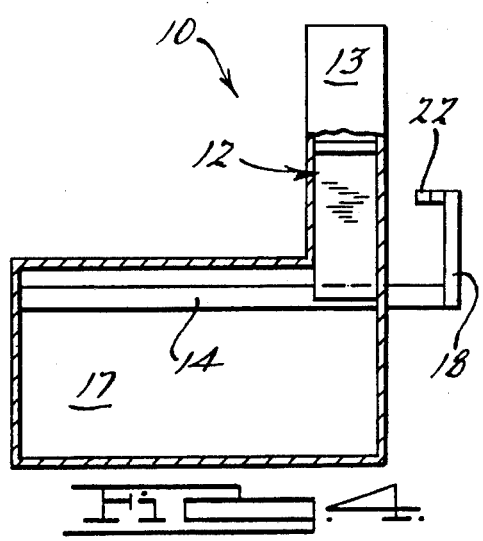
FIG. 4 is a diagrammatic view taken generally along the line 4—4 of FIG. 2.

As seen in FIG. 1, a pressure regulator 10, in accordance with a preferred embodiment of the present invention, senses pressure fluctuations in pollution control equipment and offsets the fluctuations by changing the differential pressure through the regulator 10. Mathematically, it is desired to maintain the sum of the pressure drop through the regulator 10 and pollution control equipment constant at a given design flow rate. In this way, pressure fluctuations in the pollution control equipment are not transmitted back to process equipment.

Figure 2:
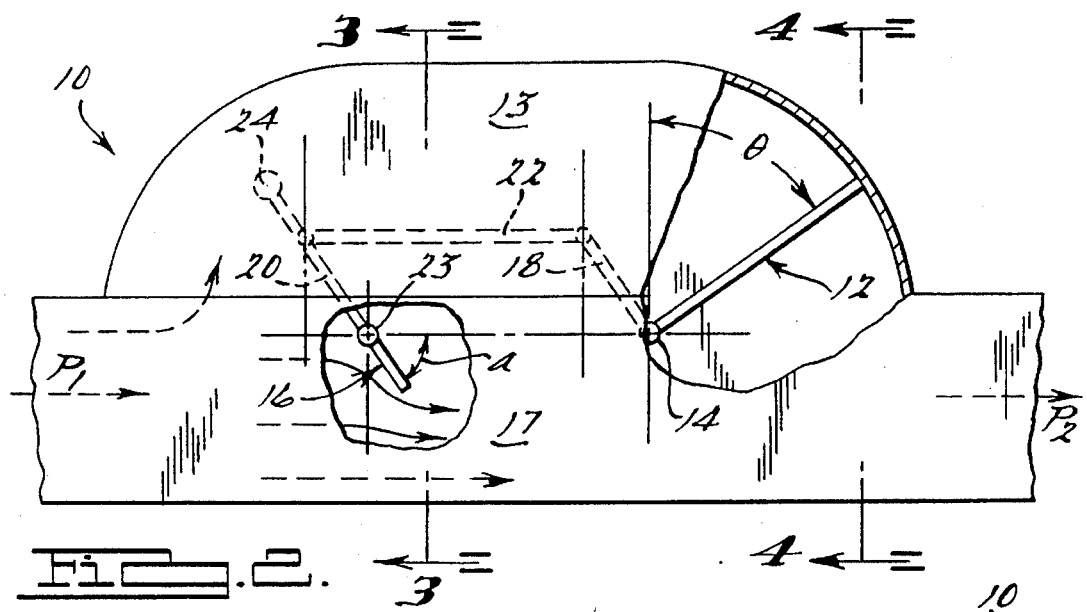
FIG. 2 is a diagrammatic view, in elevation, of the pressure regulator.

The regulator 10 comprises a sensor blade 12 that is housed in a sensor duct 13 and pivoted on a transversely extending shaft 14. The shaft 14 is mechanically linked to a regulator blade 16 in a main duct 17 by mechanical linkage comprising an arm 18 on the sensor blade 12 that is connected to an arm 20 on the regulator blade 16 by a link 22. The regulator blade 16 is supported for rotation by a transversely extending shaft 23. A diagrammatic representation in FIG. 2 shows the regulator blade 16 balanced to an equilibrium position by a balance weight 24.

Since the approach velocity of the small amount of air flowing past the sensor blade 12 is minimal, there is virtually no velocity pressure immediately upstream or downstream thereof. Hence, the pressure drop across the sensor blade 12 is due to a static pressure differential thereacross. Moreover, the pressure differential across the sensor blade 12 is independent of blade angle θ.

The sensor blade 12 and regulator blade 16 are interconnected through the mechanical links 18, 20 and 22, so that clockwise rotation of the sensor blade 12 causes clockwise rotation of the regulator blade 16, and vice versa. Thus, any change in the pressure differential across the sensor blade 12 effects rotation of the sensor shaft 14 and like rotation of the regulator shaft 23 and regulator blade 16. Process emission flow is accelerated or decelerated past the regulator blade 16 causing a pressure drop across the regulator blade 16 related to its angular position.

In operation, a decrease in pressure downstream from the sensor blade 12 will cause the sensor blade 12 to rotate clockwise. Flow through the sensor duct 13 will remain largely unchanged since it is not altered by sensor blade position.

Clockwise rotation of the sensor blade 12 causes clockwise rotation of the regulator blade 16 to a position that tends to increase the pressure differential through the regulator 10. Counterclockwise rotation of the sensor blade 12 has the opposite affect on the regulator 10. Thus, pressure changes downstream of the industrial process equipment are not transmitted to said equipment.

Stated in another manner, where the interaction of an exhaust fan and valves within pollution control equipment causes a momentary change (increase or decrease) in system flow resistance at a given flow rate, the regulator 10 responds with an opposing change in flow resistance to maintain the overall system resistance constant.

An additional feature of the regulator 10 is that the compensating pressure exhibited by the regulator 10 can be adjusted by the location, length, angular orientation and size of a counterweight 40, by the lengths of the links 18, 20 and 22 which control the relationship between the angles θ and α of the sensor blade 12 and regulator blade 16, respectively, or by the length and width of the sensor blade 12 and regulator blade 16.

From the forgoing it should apparent that the pressure regulator 10 of the instant invention minimizes pressure fluctuations in industrial process exhaust ductwork due to momentary pressure fluctuations in pollution control equipment.

I claim:

1. A pressure regulation system for an industrial process system connected to a pollution control system comprising:

an elongated process emission duct connecting the industrial process equipment to said pollution control equipment;

a regulator blade in said duct pivoted for rotation about an axis transverse thereto;

a discrete sensor duct extending parallel to said process emission duct of relatively smaller cross section, said sensor duct having an inlet and an outlet connected to said emission duct at longitudinally spaced locations on said emissions duct for conducting fluid laterally into and out of said sensor duct, said sensor duct having an arcuate section for the acceptance of a rotatable sensor blade;

a sensor blade in said sensor duct between the inlet and outlet thereof and pivoted for rotation relative to said sensor duct about the axis of generation of the arcuate section in said sensor duct so as to substantially close said sensor duct at all times whereby a relatively small amount of process emission flow is directed at said sensor blade at minimum approach velocity and the pressure differential thereacross is independent of blade angle; and a linkage connecting said sensor and regulator blades whereby rotation of said sensor blade effects rotation of said regulator blade to vary the cross-sectional area of said emissions duct inversely to a change in the pressure differential across said sensor blade.

2. A pressure regulation system in accordance with claim 1 wherein the inlet to said sensor duct is upstream of said regulator blade and the outlet from said sensor duct is downstream from said regulator blade.

3. A pressure regulator in accordance with claim 1 wherein said sensor blade has a cross-sectional area substantially equal to the cross-sectional area of said sensor duct.

* * * * *